United States Patent
Baratto et al.

(10) Patent No.: US 11,286,168 B2
(45) Date of Patent: Mar. 29, 2022

(54) PROCESS FOR THE SYNTHESIS OF AMMONIA WITH LOW EMISSIONS OF CO2 IN ATMOSPHERE

(71) Applicant: CASALE SA, Lugano (CH)

(72) Inventors: Francesco Baratto, Como (IT); Raffaele Ostuni, Lugano (CH)

(73) Assignee: Casale SA, Lugano (CH)

( * ) Notice: Subject to any disclaimer, the term of this patent is extended or adjusted under 35 U.S.C. 154(b) by 66 days.

(21) Appl. No.: 16/485,695

(22) PCT Filed: Jan. 31, 2018

(86) PCT No.: PCT/EP2018/052358
§ 371 (c)(1),
(2) Date: Aug. 13, 2019

(87) PCT Pub. No.: WO2018/149641
PCT Pub. Date: Aug. 23, 2018

(65) Prior Publication Data
US 2020/0055738 A1   Feb. 20, 2020

(30) Foreign Application Priority Data

Feb. 15, 2017 (EP) .................................... 17156256
Oct. 6, 2017 (EP) .................................... 17195305

(51) Int. Cl.
*C01C 1/04* (2006.01)
*C01B 3/02* (2006.01)
*C01B 3/48* (2006.01)

(52) U.S. Cl.
CPC ............... *C01C 1/04* (2013.01); *C01B 3/025* (2013.01); *C01B 3/48* (2013.01);
(Continued)

(58) Field of Classification Search
CPC .. C01C 1/04; C01B 3/025; C01B 3/48; C01B 2203/0244; C01B 2203/0283;
(Continued)

(56) References Cited

U.S. PATENT DOCUMENTS

2004/0234426 A1   11/2004   Reddy et al.
2014/0248205 A1   9/2014   Allam
(Continued)

FOREIGN PATENT DOCUMENTS

WO   2010018550 A1   2/2010

OTHER PUBLICATIONS

International Preliminary Report on Patentability for International Application No. PCT/EP2018/052358 completed May 10, 2019.
(Continued)

*Primary Examiner* — Jafar F Parsa
(74) *Attorney, Agent, or Firm* — Dorsey & Whitney LLP (57) ABSTRACT

Process for the synthesis of ammonia from natural gas comprising conversion of a charge of desulphurized natural gas and steam, with oxygen-enriched air or oxygen, into a synthesis gas, and treatment of the synthesis gas with shift reaction and decarbonation, wherein a part of the CO2-depleted synthesis gas, obtained after decarbonation, is separated and used as fuel fraction for one or more furnaces of the conversion section, and the remaining part of the gas is used to produce ammonia.

23 Claims, 4 Drawing Sheets (52) U.S. Cl.
CPC ............... *C01B 2203/0244* (2013.01); *C01B 2203/0283* (2013.01); *C01B 2203/042* (2013.01); *C01B 2203/0445* (2013.01); *C01B 2203/0475* (2013.01); *C01B 2203/068* (2013.01); *C01B 2203/1241* (2013.01)

(58) Field of Classification Search
CPC ...... C01B 2203/042; C01B 2203/0445; C01B 2203/068; C01B 2203/0827; C01B 2203/86

See application file for complete search history.

(56) References Cited

U.S. PATENT DOCUMENTS

| | | |
|---|---|---|
| 2015/0031916 A1 | 1/2015 | Kiss |
| 2016/0115017 A1* | 4/2016 | Ostuni ................ C01B 3/48 252/374 |

OTHER PUBLICATIONS

International Search Report from International Application No. PCT/EP2018/052358 dated Jul. 31, 2018.

* cited by examiner

PROCESS FOR THE SYNTHESIS OF AMMONIA WITH LOW EMISSIONS OF CO2 IN ATMOSPHERE

FIELD OF APPLICATION

The invention relates to the field of ammonia synthesis plants fed with natural gas (NG).

PRIOR ART

The ammonia synthesis plants of the type considered here comprise a section adapted to convert the natural gas into a make-up gas containing hydrogen and nitrogen, and a synthesis section wherein said make-up gas reacts catalytically at high pressure to produce ammonia.

The section which generates said make-up gas is referred to in the technical language as the "front end". The term "back end" is instead used to denote the section for ammonia synthesis and the respective cooling section intended to cool the effluent of the synthesis section in order to separate the ammonia.

In the front end, the desulphurized natural gas undergoes reforming, resulting in a gas containing essentially hydrogen, carbon monoxide CO and carbon dioxide $CO_2$. Said gas then undergoes a shift reaction which converts CO into $CO_2$; removal of $CO_2$ (decarbonation) and preferably methanation.

The reforming process, in a common type of plant, comprises primary steam reforming and a subsequent catalytic air-fired secondary reforming. The primary reformer is heated by burners fuelled by a part of the available natural gas. In the secondary reformer the effluent from the primary reformer burns due to contact with the oxygen contained in the air. In some plants other reforming configurations are used, for example an autothermal reformer (ATR) preceded by a furnace for heating the charge, i.e. the gaseous mixture fed to said reformer.

The above described ammonia plants result in significant emissions of $CO_2$ into the atmosphere, overall in the region of 100 million tonnes of $CO_2$ per year. One of the main sources of $CO_2$ emission consists in the combustion fumes of the primary reformer and other burner furnaces if any, for example auxiliary heaters.

For environmental reasons, it is required to minimize the $CO_2$ emissions from the fumes of the NH3 plants. The problem affects in particular the older ammonia plants which are less efficient than the new ones and have greater $CO_2$ flue emissions in relation to the quantity of ammonia produced. It is also necessary that the reduction of the emissions should not increase excessively the costs for production of the ammonia.

According to the present state of the art, the processes for capturing $CO_2$ from fumes are based on washing with solvents (for example the solvent KS-1™ produced by Mitsubishi). The associated plants are, however, costly and complicated, have a high energy consumption and require expensive solvent. Therefore these $CO_2$ capturing processes cannot be applied to the plants considered here since they would increase excessively the costs for production of the ammonia.

In some ammonia synthesis processes of the prior art, part of the fuel may be supplied by a purge flow obtained, for example, from a cryogenic purification section of the synthesis gases or from a PSA unit. Said purge flow may have a reduced $CO_2$ content. However, said purge flow accounts for a small amount of the total fuel and does not solve the problem of the $CO_2$ emissions in the atmosphere.

SUMMARY OF THE INVENTION

The object of the invention is to provide a method for conducting ammonia synthesis processes with $CO_2$ emissions into the atmosphere which are greatly reduced compared to the prior art. Another object of the invention is to provide a method for revamping the existing plants, of the type using air-fed secondary reformers able to reduce drastically the $CO_2$ emissions into the atmosphere.

The objects are achieved with a process and a revamping method according to the claims.

According to the invention, a process for synthesis of ammonia from natural gas comprises:
conversion of a charge of desulphurized natural gas and steam, with oxygen-enriched air or with oxygen, to form a synthesis gas containing hydrogen, CO and $CO_2$;
a treatment of said synthesis gas comprising at least one shift reaction of the carbon monoxide into $CO_2$, and subsequent separation of $CO_2$ from the gas, thus obtaining a $CO_2$-depleted synthesis gas and a $CO_2$-rich gaseous flow containing the $CO_2$ separated from the gas;
optionally, a step for methanation of the synthesis gas and/or addition of nitrogen to the synthesis gas, obtaining a make-up gas containing nitrogen and hydrogen in a suitable molar ratio for ammonia synthesis,
characterized by:
separation of a part of said $CO_2$-depleted synthesis gas, obtaining a fuel fraction of the synthesis gas, wherein said fuel fraction is fed as fuel to at least one furnace.

The invention also relates to a method for revamping a plant originally comprising a reforming section which includes a primary steam reformer and air-fired secondary reformer, and treatment of the synthesis gas comprising a shift reaction of carbon monoxide into carbon dioxide, decarbonation and optionally methanation. The revamping method comprises at least:
providing a flow of enriched air or oxygen and using said flow as an oxidant for the secondary reformer instead of the air;
separating a part of the synthesis gas downstream of decarbonation,
feeding said part of the synthesis gas, which has a reduced $CO_2$ content, as fuel for at least one furnace of the plant.

The term "furnace" is understood as meaning an apparatus chosen from among: a steam reformer or a charge preheater or a steam generator or a steam superheater. These apparatus, which operate by means of combustion, are identified by the term "fired heater". Said furnace in some embodiments forms part of the section for converting the natural gas into synthesis gas. In combined ammonia/urea plants said furnace may form part of the urea section.

The portion of synthesis gas which is separated and sent to said at least one furnace is termed fuel fraction of the gas available after the shift step. Preferably, said fuel fraction is comprised between 1% and 40% of the available gas, more preferably between 10% and 30% and even more preferably between 20% and 30%. For example in a preferred embodiment the fuel fraction is equal to 30%. The remaining part, which is intended to be converted into ammonia, is called process fraction.

It should be noted that said fuel fraction is relatively high, for example about ⅓ of the total. The invention in fact envisages that a non-negligible portion of synthesis gas is allocated to fuel in order to reduce the $CO_2$ emissions. This results in the need to produce an additional quantity of synthesis gas, but, as will be explained more clearly below with the aid of the examples, this necessity is compensated for by the advantages of the invention.

The separation of the fuel fraction is advantageously performed by splitting a process flow, for example a process gas after shift and decarbonation. As a result of said splitting, the fuel fraction and the remaining part of the gas, also called process fraction, have the same composition.

It should be noted that the present invention envisages deliberately allocating a part of the process flow to the fuel fraction, the fuel fraction being directly separated from the process flow and having the same composition. The prior art, on the other hand, teaches only allocating as fuel any purge streams derived from purification processes and containing methane. The said synthesis gas with a low CO2 content (CO2-depleted syngas) preferably contains no more than 1000 ppm by volume (0.1%) of CO2. Said gas is composed essentially of hydrogen ((H2) with any small residual quantities of CO and CH4, typically less than 2% by volume and preferably less than 1%.

The combustion of said gas is substantially free from production of CO2. In fact, the combustion of the hydrogen does not form CO2, and only the small quantity of CO or CH4, if present, may form CO2.

The invention suggests using a process gas part as fuel for one or more furnaces of the reforming section, differently from the prior art which, for this purpose, uses part of the natural gas, i.e. a hydrocarbon. The process gas part (fuel fraction) is suitably separated after a CO2 removal treatment and, as explained further above, it contains essentially hydrogen which may burn without forming CO2. Consequently it can be understood that the invention allows the CO2 emissions into the atmosphere to be drastically reduced.

Said oxygen-enriched air preferably contains at least 50% oxygen by volume and more preferably at least 90% oxygen by volume and even more preferably at least 95%. The advantages of a high oxygen content in the enriched air are as follows: greater calorific power of the synthesis gas; smaller flow of flue discharge gas; smaller volumetric flow through the apparatus of the conversion section and, consequently, smaller apparatus.

The CO2-depleted synthesis gas preferably forms all—or substantially all—the fuel of the furnaces used for the process. In some embodiments, however, it is preferred to keep a small amount of natural gas which is called "trim fuel" of the furnace. Preferably said small quantity accounts for not more than 15%, more preferably not more than 10%, of the total combustion heat (duty) of the furnace. The trim fuel allows the furnace to be rapidly controlled, for example in order to quickly raise or lower the load if needed.

Said percentage of the combustion heat may be expressed as the product between the flowrate (kg/s or mol/s) and the calorific power (J/kg or J/mol).

According to some embodiments of the invention, methanation of the synthesis gas is performed downstream of decarbonation. The methanation step converts residual CO and CO2 into CH4, consuming H2, in accordance with the reactions CO+3H2→CH4+H2O e CO2+4H2→CH4+2H2O.

Preferably, the separation of the fuel fraction from the CO2-depleted synthesis gas is performed before (upstream of) said methanation step.

The advantage of separating the fuel fraction before methanation is that of not oversizing the methanation section of the fuel fraction, and of not losing the methanation heat of the fuel fraction. Moreover, for the same furnace heat requirement and the same gas temperature, the fuel fraction is slightly less if removed before methanation.

There are no disadvantages as regards CO2 emissions into atmosphere, which are the same by using as fuel both the gas upstream of the methanator and the gas downstream of the methanator, for the same flowrate. In case of nitrogen addition, the fuel fraction is separated before adding nitrogen. The advantage is a greater calorific power of the synthesis gas used as fuel, which does not contain nitrogen, or contains a smaller amount thereof.

After separating the fuel fraction, the CO2-depleted synthesis gas may be optionally treated in a purification section comprising, for example, a PSA unit or comprising a dryer followed by a cryogenic unit.

The purification section produces at least one stream of ammonia synthesis gas with a reduced content of inerts, and at least one waste stream containing CO, and CH4. The waste stream may also contain H2 and N2. In some embodiments, at least part of the waste gas of said purification section is used as fuel together with the fuel fraction. Consequently, the fuel fraction may be reduced.

The advantage of the purification unit is that of reducing the inerts content in the make-up gas, resulting in known advantages for the ammonia synthesis, including smaller consumption for circulation and a reduction (or even elimination) of the purge flow of the ammonia synthesis loop.

According to the invention, the fuel fraction is advantageously separated upstream of the purification unit. Consequently, only the synthesis gas portion supplied to the ammonia synthesis undergoes treatment in the purification section which, without having to process the synthesis gas corresponding to the fuel fraction, may be realized with much smaller dimensions. The advantage of separating the fuel fraction upstream of the purification unit is that of avoiding oversizing of the purification unit and the corresponding consumption for the fuel fraction of the synthesis gas. Another advantage is the possibility of controlling separately the fuel fraction and the purification unit.

There is no disadvantage in separating the fuel fraction upstream of the purification from the point of view of the CO2 emissions into atmosphere, since the CO, CO2 and CH4 contained in the synthesis gas of the fuel fraction would be separated by the purification unit to form the waste stream and used as fuel.

Advantageously, the purification unit does not need to have an excessively high hydrogen recovery, because the hydrogen "lost" in the waste gas is used as fuel and does not produce CO2 emissions into atmosphere. The fuel fraction of the synthesis gas is consequently regulated.

Preferably, however, the purification unit has a sufficiently high hydrogen recovery such that the fuel fraction accounts for at least 30%, preferably at least 40%, even more preferably at least 50% of the furnace duty. The applicant has found that this condition is advantageous for the control of the furnace itself independently of the control of the purification unit.

The purification section may comprise selective adsorption of the undesirable components onto a solid. In some embodiments said purification section comprises a PSA (pressure swing adsorption) unit which uses molecular sieves for separating CO, CH4, Ar, H2O and residual CO2. In other embodiments said section comprises at least one dryer for separating residual CO2 and water, followed by a cryogenic unit for separation of CO, CH4 and Ar. The cryogenic separation unit is preferably a Liquid Nitrogen Wash (LNW) unit.

A PSA unit typically produces a single flow of purified product, substantially at the feed pressure, and a single stream of waste gas, at a pressure much lower than the feed pressure. Said waste stream contains CO, CH4, Ar, H2O and residual CO2, and may contain H2 and N2.

If the purification section comprises dryer and LNW, the purified product may emerge as one or more streams, and may already contain H2 and N2 in a suitable ratio for the synthesis of ammonia.

The dryer has a tail gas, product of regeneration of the molecular sieves used for capturing mainly H2O and the traces of residual CO2 contained in the feed, which would freeze during the cryogenic treatment in the LNW unit. The dryer may be regenerated with a nitrogen flow (from the air separation unit). In this case the tail gas containing N2, H2O and CO2 may be discharged into atmosphere or combined with the tail gas of the LNW described below.

The LNW also has at least one tail gas which contains the bottom end product of the LNW absorption column, containing CH4 and CO, in addition to N2 and H2. The discharge gas of the LNW may be conveyed away as fuel.

The tail gas of the LNW may be used at least partly for the regeneration of the dryer before being conveyed away as fuel.

The synthesis gas with a low content of inerts may be conveyed away for ammonia synthesis.

Methanation is an exothermic reaction, but there is not a substantially large amount of reaction heat and it is usually not recovered.

Methanation therefore leaves a small quantity of methane in the synthesis gas (methane slip). The presence of said small quantities of methane in the synthesis gas is not a problem for the purposes of ammonia production, since methane is inert to the synthesis reaction. Methane accumulates in the purge flow of the synthesis loop. However, by using the purge flow of the synthesis loop as fuel, the methane contained therein constitutes a source of CO2, albeit of small entity.

The carbon monoxide contained in the synthesis gas also constitutes a source of CO2, albeit of small entity, both owing to combustion of the synthesis gas used as fuel, and owing to combustion of the waste gas of a purification unit, where present.

In some embodiments of the invention, in order to reduce also this source of CO2 (i.e. the emissions caused by the presence of residual carbon monoxide of the synthesis gas), the process comprises a catalytic purification which selectively converts the CO into CO2 upstream of decarbonation. Selective conversion of the carbon monoxide may be obtained, for example, using the process known as Selectoxo™ which operates with the reaction $CO + \frac{1}{2}O_2 \rightarrow CO_2$. The oxygen for selective oxidation of the CO may be a part of the mentioned enriched-air or oxygen flow.

An advantage of said selective conversion of CO into CO2 is that at least part of the residual CO from the shift is converted into CO2 and removed during decarbonation. Consequently, the combustion of the synthesis gas, of the synthesis loop purge flow, or of the purification waste gas, produces a smaller quantity of CO2.

According to the invention, the CO2 flue emissions are mainly determined by the CO, CO2 and CH4 content of the synthesis gas downstream of decarbonation, as well as by the optional trim fuel flow which will be described below.

The combustion of said gas is substantially free from CO2 production. In fact, the hydrogen combustion does not form CO2, and only the small quantity of CO or CH4, if present, may form CO2.

The CO2 production is also derived from the combustion of the methane contained in the synthesis loop purge flow.

In case a purification unit is present, CO2 production is also derived from the combustion of CO, CH4 and residual CO2 of the discharge gas.

According to one aspect of the invention, the fuel fraction is produced in excess compared to the fuel required for the conversion section, the quantity of said fuel fraction exceeding that required being exported from the process, and the regulation of the conversion section is performed by modulating the quantity of said fuel fraction directed towards the conversion section and the quantity exported by the process.

The conversion of the natural gas into synthesis gas may be performed using different techniques.

According to some embodiments of the invention, the step of natural gas conversion into synthesis gas comprises primary reforming followed by secondary reforming. In some embodiments, more preferably, the conversion step comprises a catalytic autothermal reforming (ATR), optionally preceded by a preliminary reforming (pre-reforming). An ATR without preliminary reforming is also called "pure ATR". Advantageously, in these embodiments, at least a part of the synthesis gas fuel fraction feeds a furnace for preheating the gas prior to autothermal reforming.

The advantage of using ATR, pure or in combination with a pre-reformer, consists in the smaller heat requirement of the furnace compared to the combination of the ATR with a primary reformer, also considering the heat required for generation and overheating of steam necessary for the process. This is due to the fact that the preheating temperature of the ATR feed and of the optional pre-reformer according to the invention is suitably chosen at a value not greater than 650° C., lower than the output temperature of the primary reformer, and due to the fact that, in the preheating furnace, there is no progression of the steam reforming reaction (which is endothermic).

A pure ATR, or ATR in combination with a pre-reformer, may advantageously operate with a steam/carbon (S/C) ratio less than that of a primary reformer. Preferably, said S/C ratio is not greater than 2, more preferably not greater than 1.5, even more preferably not greater than 1. This also helps reduce the heat required by the furnace for preheating the feed of the ATR and optional pre-reformer.

In the case of ATR without primary reformer, the fuel fraction is preferably comprised between 1 and 30%, more preferably between 10 and 30%, even more preferably between 10 and 20%.

In some embodiments the step for converting the natural gas into synthesis gas comprises a non-catalytic POX (partial oxidation) step. Advantageously, in these embodiments at least a part of the synthesis gas fuel fraction feeds a furnace for preheating the gas before said partial non-catalytic oxidation or for steam generation or steam superheating.

The advantage of using a POX consists in the smaller heat requirement of the furnace compared to the combination of an ATR with a primary reformer, also considering the heat required for generation and overheating of steam necessary for the process. This is due to the fact that the preheating temperature of the POX feed according to the invention is suitably chosen at a value not higher than 500° C., markedly lower than the output temperature of the primary reformer, and due to the fact that in the preheating furnace there is no progression of the steam reforming reaction (which is endothermic). Moreover, POX may advantageously use a S/C ratio lower than that of a primary reformer, preferably not greater than 2, more preferably not greater than 1, even more preferably not greater than 0.5. This also helps reduce the heat required by the preheating furnace.

In the case of POX, the fuel fraction is preferably comprised between 1 and 30%, more preferably between 10 and 30%, even more preferably between 10 and 20%.

The reduction in the heat required by the preheating furnace for a POX and for a pure ATR compared to an ATR in combination with a primary reformer provides the following advantages: the fuel fraction of the synthesis gas is less, and it is possible to reduce the quantity of trim fuel, therefore lower CO2 flue emissions may be obtained.

Both in the case of POX with optional purification unit of the synthesis gas and in the case of ATR without primary reformer and with optional purification unit of the synthesis gas, it is preferable to select a purification unit with high hydrogen recovery, for example a liquid nitrogen wash, so as to ensure that the fuel fraction of the synthesis gas is sufficiently large to control the furnace independently of control of the purification unit.

Another advantage of the POX and ATR without primary reformer, consequence of both the smaller fuel fraction and the smaller steam/carbon ratio, is the smaller autogenous steam production, which reduces the heat required for the associated overheating, the fuel fraction, the CO2 flue emissions and the total natural gas consumption.

The smaller autogenous steam production may result in a lack of steam for driving the turbines or of electricity for powering the motors of the machines. The missing energy may be conveniently imported from outside the plant as electricity with reduced CO2 emissions, for example generated by renewable sources. It should be pointed out that this synergy is not possible if the process already produces an excess of steam or energy, for example in the case of combination of primary reformer and ATR with a fairly large fuel fraction.

In some embodiments the step of converting the natural gas into synthesis gas also comprises a steam reforming step. Advantageously, in these embodiments at least a part of the synthesis gas fuel fraction feeds the burners of the reformer.

A part of the fuel fraction may be allocated, in some embodiments, to furnaces for the production and/or superheating of steam.

The invention also allows to produce the electricity necessary for the synthesis of ammonia or of its derivatives (for example urea) with low emissions of CO2, using as fuel CO2-depleted synthesis gas, for example in the following ways:
  expansion in a turbo generator of a flow of steam produced in a steam generator or steam superheater, fed by the CO2-depleted synthesis gas as fuel;
  combustion in a gas turbine or in a gas engine, fed by the CO2-depleted synthesis gas as fuel.

Generally, in ammonia processes, a purging gas is extracted from the ammonia synthesis loop, in order to remove the inert substances from the synthesis loop, and said purging gas is treated with a process for recovery of the hydrogen contained in it (HRU). Said recovery process generates a hydrogen-rich gas which may be reused for synthesis and a tail gas containing most of the methane initially contained in the purging gas. The methane in the tail gas is practically all that contained in the process fraction of the synthesis gas. Normally said tail gas, given its relatively high methane content, is used exclusively as fuel. This use of tail gas, however, generates CO2 emissions.

According to one aspect of the invention at least a part of said tail gas is recycled as process gas during the natural gas conversion step, for example during the reforming or partial oxidation step. An associated advantage is a further reduction in the CO2 emissions.

In some embodiments a part of the said CO2-depleted synthesis gas is treated in a nitrogen (N2) separation unit, preferably a membrane unit, obtaining a nitrogen-depleted synthesis gas and a nitrogen-rich flow; at least a part of the nitrogen-depleted synthesis gas (preferably all of it) is used as fuel; the remaining part is fed to the ammonia synthesis together with the nitrogen-rich flow.

This configuration is particularly advantageous if the O2-enriched air does not have a very high purity (for example less than 95% of O2) and/or if the natural gas contains nitrogen. Three benefits are obtained: an increase in the calorific power of the fuel gas, a reduction in the flow of combustion fumes (and the power of the respective ID fan) and conservation of the nitrogen which is a reagent for the ammonia. The membrane nitrogen separation unit is further preferred because said unit may operate using the pressure difference between the synthesis gas (produced at high pressure) and the combustion in the furnace (which occurs at atmospheric pressure). Moreover, the nitrogen-rich flow, which is used for synthesis, does not lose pressure.

The configuration described above, which envisages separation of the nitrogen from the synthesis gas, is applicable also in a conventional process, with primary steam reformer and secondary air-fired reformer, resulting in the advantage that it is not required to modify or enlarge the air compressor. However, with a secondary air-fired reformer and without modifying the compressor, and therefore without being able to increase the air flow, the additional fraction of synthesis gas (required as fuel) would have to be produced by increasing the capacity of the primary reformer and/or installing a gas-heated reformer (GHR), both solutions being very costly. For these reasons, the nitrogen separation described is particularly preferred in combination with the use of the enriched air during conversion of the natural gas into synthesis gas.

In some embodiments, it is envisaged expanding, with production of mechanical work, the CO2-depleted synthesis gas after optionally heating it.

Said gas is available at a pressure higher than the pressure required for combustion in a furnace and therefore it may be expanded in a suitable machine, such as an expander or a turbine, producing mechanical work. For example, said expansion may be from about 25 bar to about 3 bar. The gas has a high specific volume given that it comprises essentially H2 and for this reason its expansion may generate a considerable amount of power. The power obtained may cover partly the process requirements, making it more efficient.

In some embodiments the shift step comprises two steps at different temperatures, for example preferably one high-temperature shift (HTS), for example carried out using an iron-based catalyst, followed by a low-temperature shift (LTS) or medium-temperature shift (MTS), for example carried out using a copper-based catalyst. The associated advantage is that of obtaining the maximum conversion of the CO into CO2, which will then be separated during the decarbonation step, so as to obtain the minimum residual CO content in the synthesis gas used as fuel. Since the CO is a source of CO2, during combustion, the advantage of minimizing the CO2 flue emissions is obtained.

In some embodiments, in which a relatively low overall S/C ratio is used, for example <2.7, the shift preferably comprises two steps in series carried out over catalyst suitable to operate with a low steam content, for example a copper-based catalyst. In this configuration, the first step consists of a medium temperature shift (MTS), which is preferably pseudo-isothermal and operates in the temperature range of 200-320° C., and the second step is a low temperature shift (LTS) operating in the temperature range 180-250° C.

The conversion of the natural gas into synthesis gas, for example by means of reforming, is preferably performed at a pressure lower than 50 bar, more preferably lower than 40 bar, and even more preferably lower than 30 bar.

Generally the prior art teaches the preference for high conversion pressures, in order to increase the capacity of the conversion section (front end) and reduce the consumption of synthesis gas compression. The present invention is instead preferably implemented with low conversion pressures in order to obtain the maximum conversion of the methane, since the steam reforming reaction is favoured at a lower pressure, so as to have the minimum residual methane content in the synthesis gas used as fuel. Since the methane is a source of CO2, during combustion, the advantage of minimizing the CO2 flue emissions is obtained.

In the case of ATR, a high methane conversion is also obtained by operating at a relatively high output temperature, >950° C., preferably >1000° C., even more preferably >1030° C.

In the case of POX, a high methane conversion is also obtained by operating at a relatively high output temperature, >1200° C., preferably >1300° C.

In some embodiments the overall steam/carbon (S/C) ratio during conversion is greater than 2.0, preferably greater than 2.2 and more preferably greater than 2.7. Generally the prior art teaches a preference for low S/C ratios in order to increase the capacity of the conversion section (front end). The invention instead envisages a relatively high S/C ratio in order to maximize the conversion of the methane and the CO during the shift step and reduce the concentration of CH4 and CO in the synthesis gas. Since the methane and CO are a source of CO2, during combustion, the advantage of minimizing the CO2 flue emissions is obtained.

In the case of pure ATR (optionally in combination with pre-reformer) or POX, the invention employs a S/C ratio not higher than 2 in the reforming section. Preferably further steam is added downstream of the reforming and upstream of the shift, until an overall S/C ratio greater than 2, and preferably greater than 2.4, is reached so as to promote the progression of the shift reaction and the associated conversion of the carbon monoxide.

The use of the trim fuel solves the problem of rapidly controlling the furnace, but at the cost of increasing the CO2 emissions into the atmosphere. For some configurations of the invention, for example those comprising a steam reformer, the trim fuel represents the greatest contribution to the CO2 emissions in the atmosphere. This will be illustrated in the examples.

In a preferred embodiment of the invention, the trim fuel is not used and the fuel of the furnace is only the synthesis gas. The fuel fraction is consequently greater than in the case where the trim fuel is used, because it is required to provide also the combustion heat of the trim fuel with the fuel fraction.

In a first embodiment, the fuel fraction has a combustion heat substantially corresponding to the heat required by the furnace. In order to rapidly control the furnace, for example in order to quickly raise or lower the load when needed, the flowrate of the fuel fraction is suitably raised or lowered. This control, however, has the undesirable effect of varying the flowrate of the make-up gas, and therefore the production. In order to re-establish the initial production, it is necessary to increase or reduce the total flowrate of natural gas fed to the reforming section, which in turn requires control of the furnace. It may be understood how this procedure is operationally undesirable.

According to one aspect of the invention: the fuel fraction is produced in an overabundant amount with respect to the requirement of said at least one furnace, i.e. a surplus of synthesis gas to be used as fuel is produced with respect to the corresponding quantity of heat required by the furnace, and the surplus of fuel synthesis gas is exported from the process, i.e. is not used either as fuel fraction or as process fraction. The availability of synthesis gas in excess (for use as fuel) allows to rapidly regulate said at least one furnace without using, or using to a lesser degree, the trim fuel, with a further advantage in terms of reduction of the CO2 emissions.

For example, the surplus may be:
exported as a further product (for example as hydrogen or as CO2-depleted fuel for consumption outside the ammonia plant) or
conveyed to a storage buffer, or
flared.

In order to rapidly control the furnace, for example in order to quickly raise or lower the load in the case of need, the flowrate of the synthesis gas surplus is suitably lowered or raised, without affecting either the fuel fraction or the process fraction.

The surplus of fuel synthesis gas may be taken from the fuel fraction, and therefore have the same composition and pressure as the fuel synthesis gas.

Alternatively, if a purification unit (for example a PSA unit) or a methanation unit is present, the surplus of fuel synthesis gas may be collected downstream of purification or methanation, so as to obtain greater purity of the surplus exported.

The surplus fuel may be separated from the tail gas of purification (PSA, or dryer+LNW), even though said solution is less preferred for two reasons:
the tail gas has a low pressure, therefore a compression is required to export said tail gas (with considerable energy expenditure and plant cost);
the tail gas contains CO, CO2 and CH4 in a concentration much greater than both the fuel synthesis gas and the purification product, therefore it has a less desirable composition.

The quantity of the surplus fuel synthesis gas is preferably >2%, more preferably >4%, and even more preferably >6% of the fuel fraction. If the surplus of the fuel synthesis gas is not exported, its quantity is preferably not greater than 15% of the fuel fraction, and even more preferably not greater than 10% of the fuel fraction, in order to prevent an excessive consumption thereof.

The invention obtains CO2 emissions which are less than 0.5 t/t (tonnes of CO2 emitted per tonne of ammonia produced); in preferred embodiments of the invention the emissions are less than 0.3 t/t or less than 0.2 t/t.

As will be illustrated in the examples, in some preferred embodiments the CO2 emissions may reach values less than 0.1 t/t or even 0.05 t/t, corresponding to a CO2 capture value close to 99%.

As regards the plant, the furnaces are advantageously equipped with dual-fuel burners able to burn both natural gas and synthesis gas. The invention may require the installation of an air separation unit (ASU) for the production of the enriched air and optionally nitrogen.

The invention may also be applied to ammonia/urea processes and plants. An ammonia/urea plant is a plant comprising a first ammonia synthesis section and a second section for synthesis of urea from ammonia and CO2, wherein at least a part of the ammonia produced in the first section feeds the second section. In this case also the CO2 separated during the decarbonation step feeds advantageously said second urea synthesis section.

The main advantages of the invention are listed below.

The separation of the CO2 is performed from a synthesis gas which has a high concentration of CO2 (15-25% mol) and is at a relatively high pressure, and therefore the separation of CO2 from this flow is much easier and requires a lower energy consumption than CO2 separated from combustion fumes.

The system according to the invention does not require solvent in order to capture CO2 from fumes.

The use of oxygen-enriched air gives rise to various advantages:
 it increases the heat value of the synthesis gas;
 combustion of the synthesis gas generates less fumes than the combustion of natural gas, for the same amount of heat released, because the combustion of hydrogen (contained in the synthesis gas) occurs with a reduction of the number of mols, unlike the combustion of methane, so that the convective current of the reformer is smaller and requires an induced draft (ID) fan which is less powerful;
 it limits the flue loss of nitrogen (which is a reagent), avoiding wastage of energy for N2 separation and compression; the generation of nitrogen for synthesis must not be increased;
 it allows a high temperature for conversion of the natural gas to be maintained, free from the constraint of avoiding the introduction of excessive nitrogen in relation to the stoichiometry of the NH3 synthesis (typical of conventional air-fired processes) with a high conversion of the methane resulting in minimal CO2 emissions.

In conventional plants with a secondary air-fed reformer, the process air is fed to said secondary reformer in stoichiometric quantities, i.e. in the quantity required to reach a H/N ratio of about 3 in the make-up gas. This means that the air flowrate (in particular the quantity of oxygen introduced into the reformer) cannot be freely chosen, for example in order to achieve full conversion of the NG.

Instead, if the oxidant and the nitrogen are separately fed to the process, it is possible to choose the flowrate of oxidant so as to obtain complete conversion of the natural gas and optionally add, downstream, the nitrogen which is needed for the desired make-up gas composition. The advantage of full conversion is to produce a synthesis gas with a smaller methane content and therefore lower CO2 emissions.

Another advantage of the invention is that the greater flowrate of gas in the front end allows more heat to be recovered and more steam to be generated. The greater quantity of steam produced in the front end limits the duty of the respective auxiliary steam-generating apparatus; an advantage is that the fuel consumption (and potential source of CO2 emissions) is represented only by the primary reformer or fired heater. If the fuel of the reformer is replaced with synthesis gas (and if necessary the associated burners replaced) a substantial elimination or zeroing of the CO2 emissions is obtained.

Another advantage is that the invention does not require necessarily separation of hydrogen from the CO2-depleted syngas, i.e. purification of the CO2-depleted syngas into a gas which is rich in H2 and a waste gas, in order to obtain low CO2 emissions into the atmosphere. The CO2-depleted syngas may be used directly for ammonia synthesis after possible methanation.

In some embodiments it may be advantageous to perform a syngas gas purification in order to reduce the overall energy consumption of the process.

When applied to revamping of plants, the invention achieves significant synergies which allows the CO2 emissions to be reduced without production losses, limiting modifications and costs. This is because the invention:
 reduces greatly the gas flowrate in the front end, and therefore the associated apparatus and (secondary, shift reaction, decarbonation or methanation) piping are suitable for a greater capacity;
 said greater capacity corresponds to the synthesis gas to be used as fuel;
 a high output temperature from the secondary reformer may be used (obtaining complete conversion of the methane), because the nitrogen is added separately from the oxygen; therefore the method according to the invention produces extra gas to be used as fuel without requiring costly modifications of the primary reformer, even when said reformer is substantially at the limit of its capacity;
 the CO2 removal section is de-bottlenecked because the invention increases the partial CO2 pressure and reduces the gas flowrate in the absorber;
 the combustion of the CO2-depleted syngas generates fewer fumes than the NG so that the convective current of the reformer and ID fan are less charged;
 it is necessary to modify only the front end, while the backend (synthesis gas compressor, ammonia synthesis, refrigerating section) is substantially unchanged.
 the process does not require intense purification of the synthesis gas in order to remove the inert components, it being sufficient to use the methanator (often the existing one); in particular, it is not necessary to perform any separation of the synthesis gas into an H2 and waste gas flow.

DESCRIPTION OF PREFERRED EMBODIMENTS OF THE INVENTION

Figure 1:
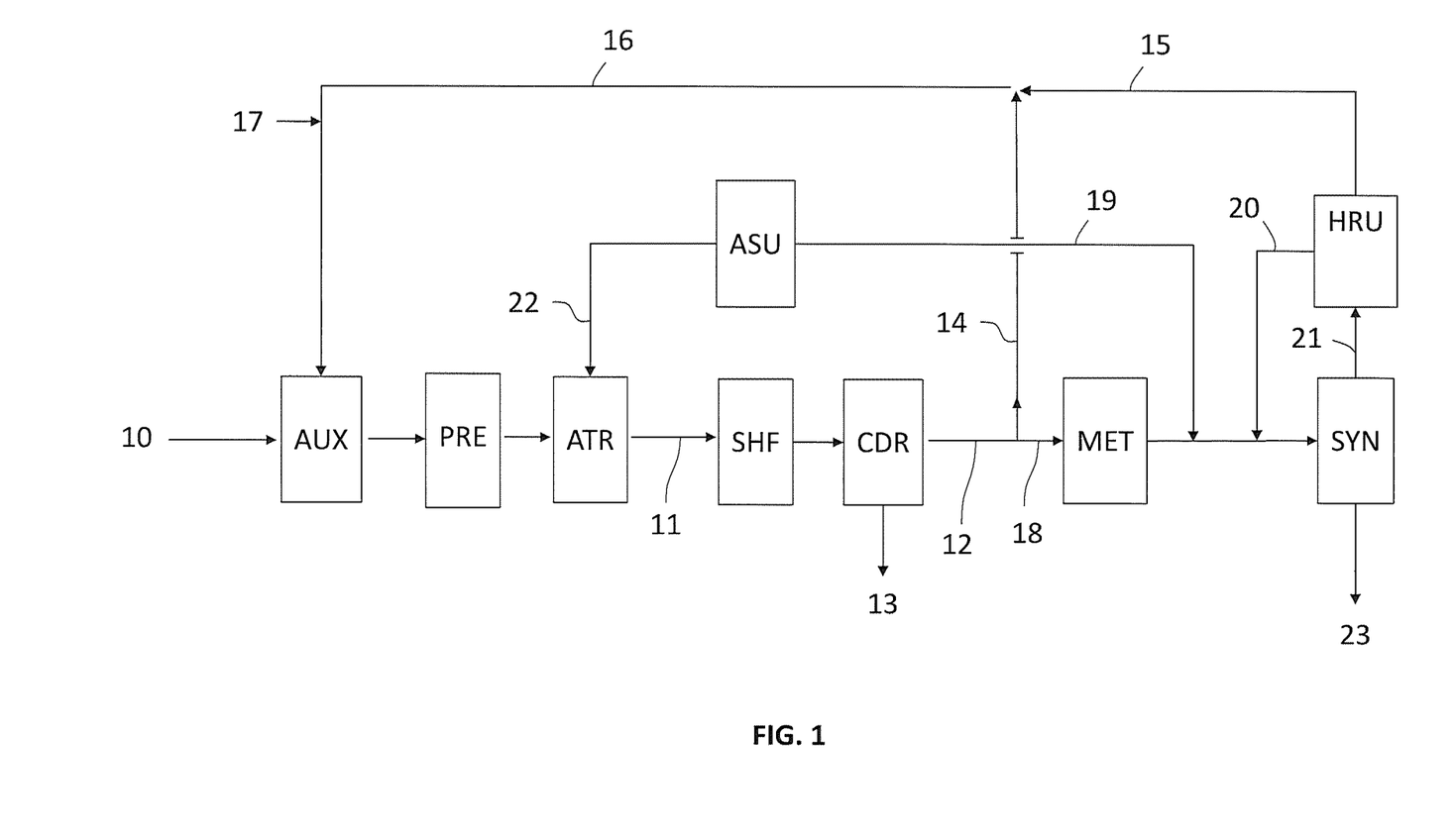
FIG. 1 shows a first embodiment of the invention.

FIG. 1 shows a process according to a mode of implementing the invention based on an oxygen autothermal reformer ATR and pre-reformer.

The blocks in FIG. 1 denote the following systems or apparatus:
AUX charge pre-heater furnace and auxiliary boiler
PRE pre-reformer
ATR autothermal reformer
POX partial oxidation reactor
SHF shift section
CDR CO2 removal section (decarbonation)
MET methanator
SYN synthesis section
HRU hydrogen recovery section
ASU air separation (fractioning) section A charge 10 comprising natural gas and steam is preheated in AUX and converted into a synthesis gas 11 via the reformers PRE and ATR. The autothermal reformer ATR operates with a flow 22 of enriched air or oxygen.

The synthesis gas, which contains H2, CO and CO2, undergoes a shift reaction in SHF and then removal of CO2 in CDR. The section SHF may comprise shift treatments at different temperatures. The section CDR operates for example with chemical/physical washing of the gas using an aqueous amine solution.

The section CDR produces a CO2-depleted syngas 12 and a flow 13 of CO2 which may be sequestered or used for other process purposes, for example in order to produce urea.

Preferably the synthesis gas 12 has the following composition: 98% H2, 1% CO+CH4, 0.1% CO2, Ar+N2 0.9%.

A part 14 of said CO2-depleted syngas 12 is used as fuel in a furnace in the front end, for example in a charge heater (AUX block). The remaining part 18 of synthesis gas is further treated in the methanator MET.

In the example, the fuel fraction 14 of synthesis gas, together with a tail gas 15 of the HRU section, feeds one or more users of the block AUX via the fuel line 16. Optionally a suitable quantity of natural gas 17 (trim gas) is added to the gas 16.

Nitrogen 18 from the air separation section ASU is added to the process fraction 18 of the synthesis gas, after it has passed inside the methanator (optional).

The gas thus obtained, together with a flow of hydrogen 20 recovered from the HRU section, feeds the synthesis section SYN. Said synthesis section produces ammonia 23 and a flow 21 of purging gas treated in the section HRU for recovery of the hydrogen contained inside it.

The separation section ASU produces, in addition to the nitrogen 19, also the flow 22 of enriched air or oxygen for the autothermal reformer ATR.

Figure 2:
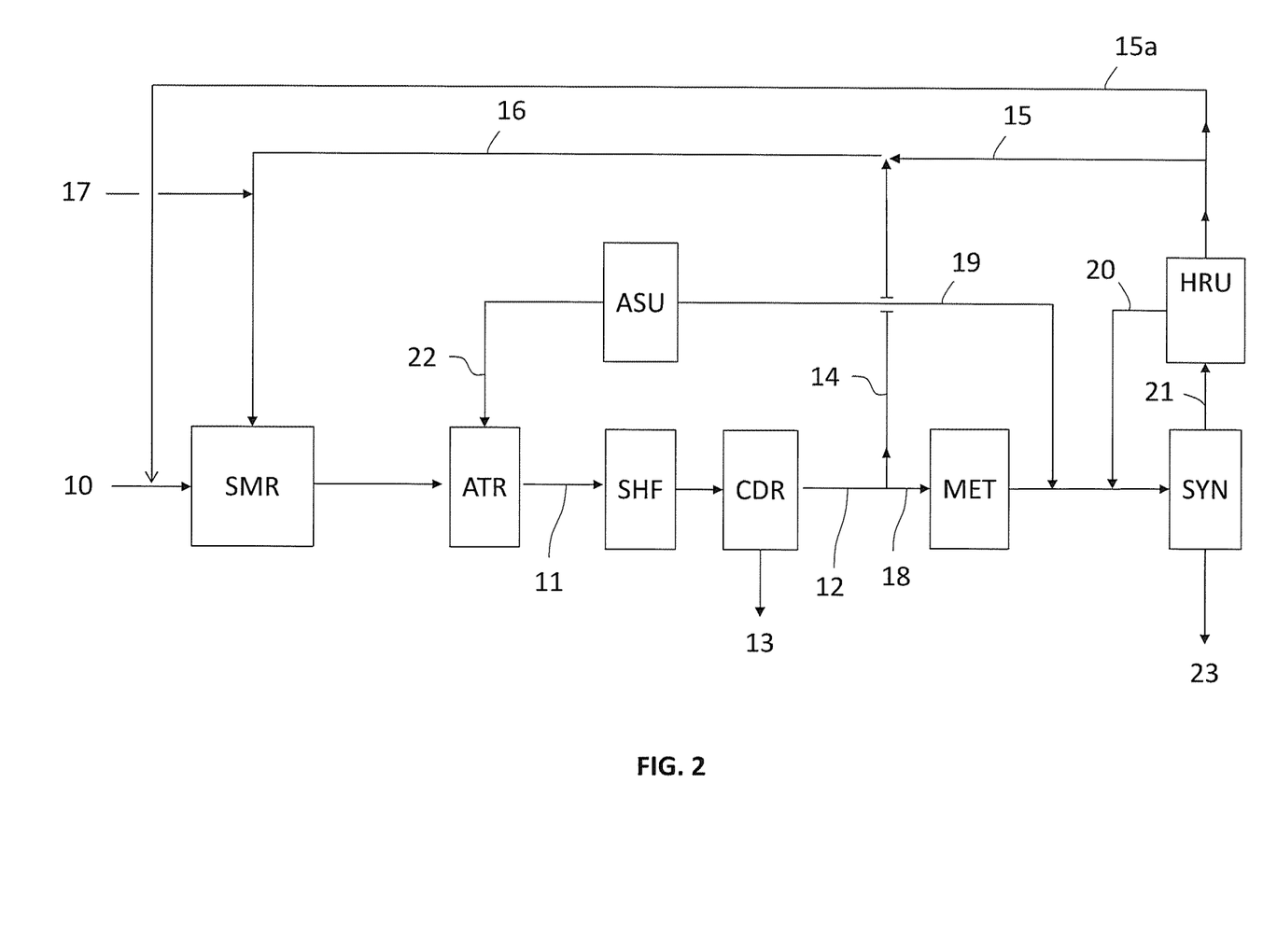
FIG. 2 shows a second embodiment.

FIG. 2 shows a process according to a preferred mode of implementing the invention based on primary reforming and ATR.

The block SMR in FIG. 1 denotes the primary reformer (or steam reformer) plus auxiliary apparatus, for example steam generators. The remaining symbols in FIG. 2 correspond to the symbols in FIG. 1 and therefore the description is not repeated.

FIG. 2 also shows an optional line 15a for recycling part of the tail gas 15 from the unit HRU for feeding the primary reformer SMR.

Figure 3:
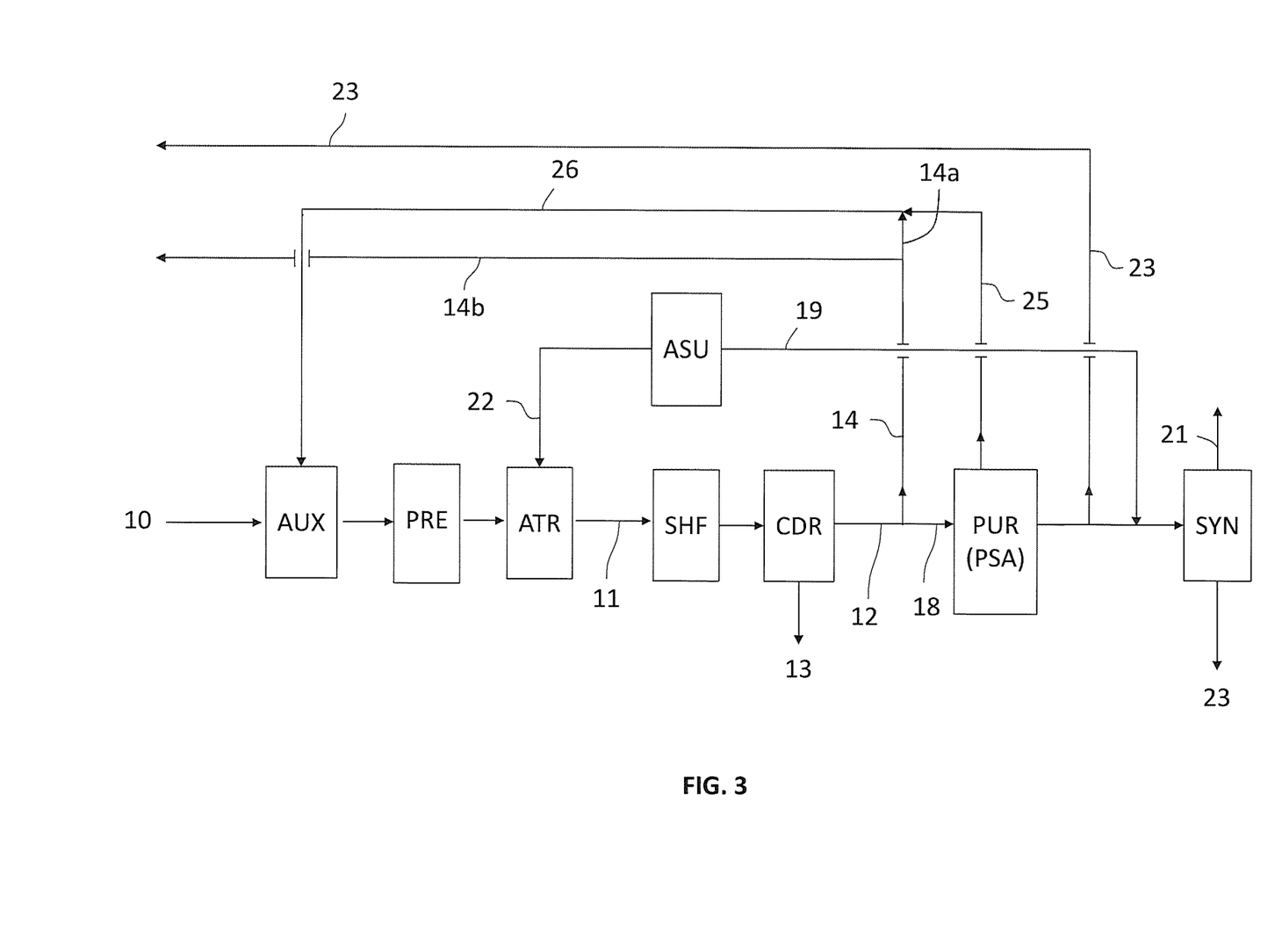
FIG. 3 shows a third embodiment.

FIG. 3 shows an ATR-based process, similar to FIG. 1, but comprising a purification of the process fraction of the synthesis gas in a section PUR, which in this example comprises a PSA unit.

The fuel fraction 14 separated from the CO2-depleted synthesis gas 12 is divided into a first portion 14a used as fuel in a furnace in the front end, for example in the block AUX, and a second portion 14b exported as excess fuel. The remaining part 18 of synthesis gas is further treated in the PSA unit.

A portion 23 of the effluent of the PSA unit is (optionally) exported as excess fuel. Said portion 23 has a greater hydrogen purity than the gas portion 14b.

In the example shown in FIG. 3, the portion 14a of synthesis gas separated as fuel fraction, together with a tail gas 25 of the PSA unit, feeds one or more users of the block AUX via the fuel line 26.

Figure 4:
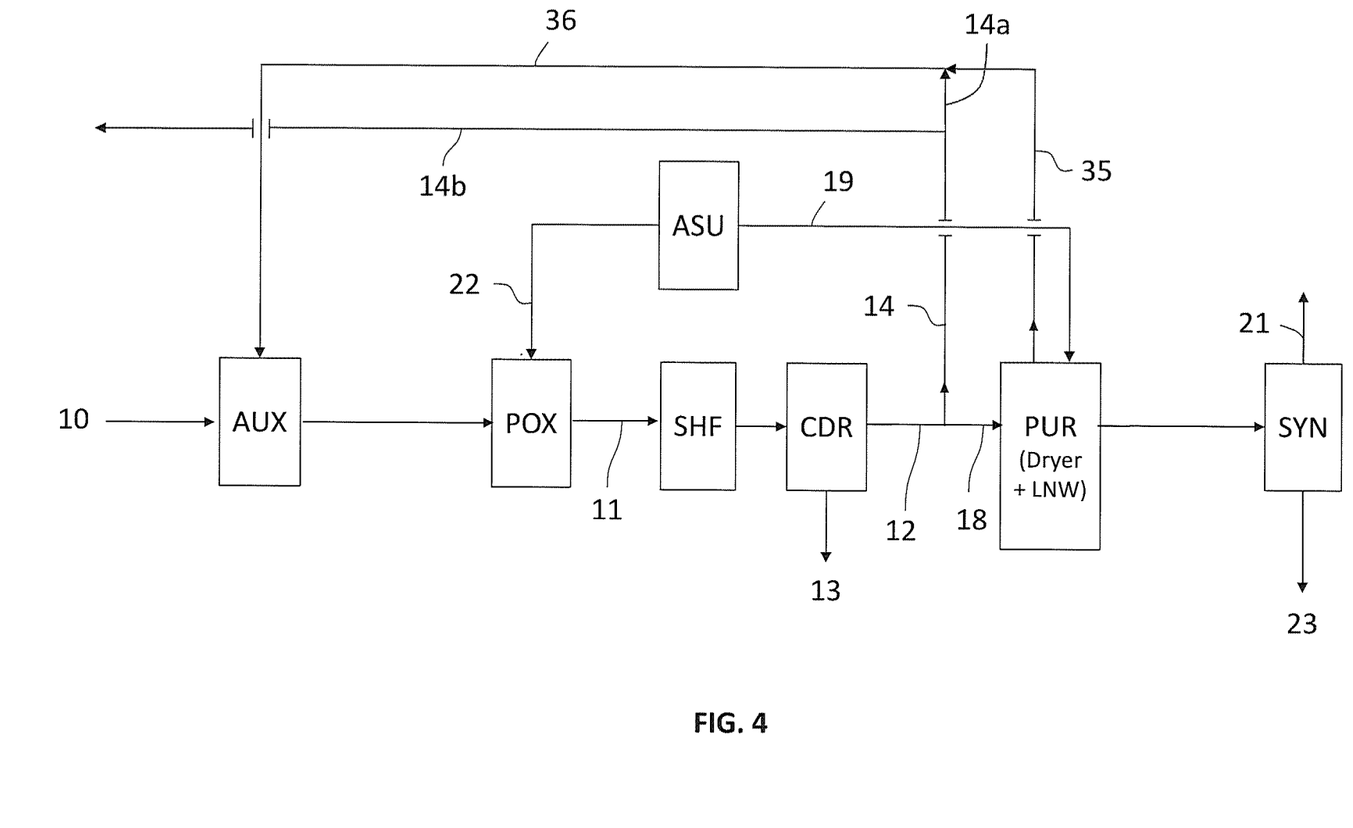
FIG. 4 shows a fourth embodiment.

FIG. 4 shows a process based on POX, comprising purification of the process fraction of the synthesis gas in a section PUR comprising dryer and LNW (liquid nitrogen wash).

In a similar manner to the embodiment shown in FIG. 3, also in this case the fuel fraction 14 separated from the CO2-depleted synthesis gas 12 is split into a first portion 14a used as fuel for example in the block AUX, and a second portion 14b exported as excess fuel. Said portion 14a, together with a tail gas 35 of the section PUR, feeds one or more users of the block AUX via the fuel line 36. Said tail gas 35 results from the combination of the tail gas of the LNW and of the dryer.

The process according to the invention allows to produce ammonia with emissions of CO2 of about 0.1 t/t compared to about 0.7 t/t in the prior art.

All the configurations illustrated may be the result of revamping of an ammonia plant with air-fed secondary reformer.

In one embodiment, the revamping procedure comprises essentially the following steps:
installing the ASU unit in order to generate the flow 22 of oxygen or enriched air;
modifying the secondary reformer in order to accept said flow 22 instead of air;
increasing the fraction of natural gas intended for the process and reducing the fraction of natural gas intended for fuel;
revamping the existing section for desulphurization of the natural gas so as to increase the capacity thereof owing to the greater process gas flowrate;
revamping the existing section CDR so as to increase the capacity thereof owing to the greater quantity of CO2 to be separated.

It can be understood that the revamping does not require costly modifications to the reformer, the exchangers and piping of the front end and the shift section. This is due to the fact that the volumetric flowrate of the gas through the front end does not increase, despite the generation of the additional gas fraction (fuel fraction).

EXAMPLE

The following Table 1 refers to a plant with a capacity of 3000 metric tonnes per day (MTD) of ammonia produced.

Table 1 compares the following options:
(1) Plant of the prior art with primary reformer and air-fed secondary reformer.
(2) Plant of the prior art, as per option (1), with capturing of the CO2 from the fumes of the primary reformer.
(3) Plant according to the invention, as per FIG. 1.
(4) Plant according to the invention, as per FIG. 2.

TABLE 1

| | | Option | | | |
| --- | --- | --- | --- | --- | --- |
| | | (1) Prior art | (2) Prior art | (3) Inv. | (4) Inv. |
| NH3 production | MTD | 3000 | 3000 | 3000 | 3000 |
| Net Natural Gas consumption based on gas LHV (FEED + FUEL-Steam exported e.g. to urea) | Gcal/t NH3 | 6.7 | 7.4 | 7.0 | 6.9 |
| | Gcal/t NH3 | | +0.7 | +0.3 | +0.2 |

TABLE 1-continued

|  |  | Option | | | |
|---|---|---|---|---|---|
|  |  | (1) Prior art | (2) Prior art | (3) Inv. | (4) Inv. |
| CO2 captured in process | MTD | 3600 | 3600 | 5200 | 5100 |
| CO2 to atmosphere (contained in flue gas) | MTD | 2100 | 200 | 200 | 200 |
| CO2 to atmosphere (contained in flue gas) | t/t NH3 | 0.7 | 0.1 | 0.1 | 0.1 |
| Main Equipment size |  |  |  |  |  |
| Total fired heater duty (reformer/fired heater + auxiliary boiler) | % | 100 | 120 | 75 | 105 |
| Process CO2 removal capacity | % | 100 | 100 | 145 | 140 |
| ASU O2 capacity | % | n/a | n/a | 100 | 60 |
| Flowrate of front end (secondary output/ATR) | % | 100 | 100 | 120 | 97 |

The table shows that the process according to the invention (option 3) requires a front end suitable for producing also the gas fraction to be used as fuel in the furnaces; in fact the quantity of CO2 captured in the process amounts to 5200 MTD compared to 3600 for options (1) and (2), and the synthesis gas flowrate in the front end is about 20% more than FIGS. 1 and 2. Despite this, the consumption of the plant is much less than that of option (2) (7.0 instead of 7.4 Gcal/MT) and is competitive with the plant without capturing according to option (1). The total duty of the furnaces is only 75% of option (1).

In option (4) the energy consumption obtained is less than in option (3), i.e. equal to 6.9 Gcal/MT, and also the cost of the plant is less. This because, in option (4), the quantity of CO2 separated in the process is less than in option (3); the duty of the furnaces is greater than in (3), but is comparable with that of options (1) and (2); the oxygen consumption is markedly less than (3); the flowrate in the front end is markedly less than (3) and comparable with (1) and (2).

The examples show how the novel process is more efficient and competitive than the prior art.

The example also shows the advantage of modifying a plant operating as per option (1), preferably implementing option (4). In fact, in this case the duty of the furnaces and the flowrate of the gases remain substantially unvaried, while the CO2 emissions are reduced. The invention thus achieves the object of minimizing the CO2 emissions of a conventional plant without losing ammonia production.

The following Table 2 refers to a plant with a capacity of 3000 metric tonnes per day (MTD) of ammonia produced, which is self-sufficient from the point of view of the steam and electric power. The process comprises the consumption relating to the compression of the CO2 sequestered up to the pressure of 100 bar. For each process, the natural gas consumption and the CO2 emissions indicated also consider the superheated steam production in AUX for driving all the turbines, and the production of the electric power necessary for the process.

Table 2 compares the following options:

(1) Plant according to the invention, with SMR+ATR as per FIG. 2, in the following variants:
a. with the overall S/C ratio=2.7, shift composed of HTS and LTS, methanator, trim fuel with flowrate corresponding to 10% of the duty required by the furnace;
b. as for 1 a, but without trim fuel.

(2) Plant according to the invention, with pre-reformer+ATR as per FIG. 3, in the following variants:
a. with the overall S/C ratio=2, shift composed of MTS and LTS, PSA, trim fuel with flowrate corresponding to 10% of the duty required by the furnace;
b. as for 2a, without trim fuel, with the Selectoxo™ process downstream of SHF and upstream of CDR for converting the residual CO.

(3) Plant according to the invention, with POX, as per FIG. 4, in the variants:
a. with the overall S/C ratio=2, shift composed of MTS and LTS, LNW dryer, trim fuel with flowrate corresponding to 10% of required duty of the furnace;
b. as for 2a, without trim fuel, with selective catalytic oxidation of CO (Selectoxo™ process) downstream of the shift reaction and upstream of the CO2 removal.

TABLE 2

|  | 1a: SMR + ATR | 1b SMR + ATR | 2a ATR | 2b ATR | 3a POX | 3b POX |
|---|---|---|---|---|---|---|
| Daily production of NH3, MTD | 3000 | 3000 | 3000 | 3000 | 3000 | 3000 |
| Daily throughput of sequestered CO2, MTD | 5600 | 5800 | 5100 | 5300 | 5350 | 5600 |
| Net consumption of natural gas (for Example 1a), dimensionless | 100% | 100% | 93% | 93% | 95% | 95% |

TABLE 2-continued

|  | 1a: SMR + ATR | 1b SMR + ATR | 2a ATR | 2b ATR | 3a POX | 3b POX |
|---|---|---|---|---|---|---|
| CO2 emissions into atmosphere per unit of ammonia produced, t CO2/t NH3 Distribution of the CO2 emissions | 0.15 | 0.075 | 0.17 | 0.10 | 0.15 | 0.05 |
| trim fuel | 50% | zero | 20% | zero | 20% | zero |
| CH4 slip in the process gas | 15% | 29% | 40% | 79% | 30% | 63% |
| CO slip in the process gas | 34% | 69% | 39% | 19% | 49% | 34% |
| CO2 slip in the process gas | 1% | 2% | 1% | 2% | 1% | 3% |

In Table 2:

"Trim fuel" as defined in the patent;

"CH4 slip in the process gas" is the residual methane content of the synthesis gas produced in the front end (i.e. in SMR+ATR in option 1, in the pre-reformer+ATR in option 2, POX in option 3), quantified upstream of optional methanation.

"CO slip in the process gas" is the residual carbon monoxide content of the synthesis gas downstream of the shift section;

"CO2 slip in the process gas" is the residual carbon dioxide content of the synthesis gas downstream of the CO2 removal section;

Several comments may be made in view of Table 2:

In the case of SMR+ATR in option 1a, the trim fuel provides the greatest percentage of the CO2 emissions; avoiding the trim fuel by exporting surplus fuel enables the emissions to be significantly reduced to less than 0.1 t/t, as shown in the Table for option 1b; at the same time, the quantity of sequestered CO2 increases from 5600 to 5800 MTD.

In the case of SMR+ATR, the CO slip in the process gas provides the second greatest percentage of the CO2 emissions in option 1a, and provides the greatest percentage in option 1b; application of the Selectoxo process to option 1a or 1b would significantly reduce the CO2 emissions; the CH4 slip in the process gas and the CO2 slip in the process gas provides a smaller percentage of the CO2 emissions.

The overall energy consumption of the options based on ATR and POX+purification (2 and 3) is decidedly lower than that of the options based on SMR+ATR (1a and 1b); this is mainly due to the synthesis gas purification (which improves the efficiency of the synthesis section and avoids the purge); the quantity of CO2 sequestered in these options (2a, 3a; or 2b, 3b) is consequently less than in options 1a or 1b.

The emissions due to the use of the trim fuel in options 2a (ATR) and 3a are of about 20% of the total emissions, much less than in option 1a, by way of confirmation of the fact that the heat required by the furnace in these two options is much less than in option 1a.

In the embodiments with ATR or POX, the residual CO and CH4 are of higher relevance owing to the lower S/C ratio at which ATR and POX operate compared to SMR+ATR; POX operates at a higher temperature than ATR, which results in a smaller residual amount of CH4, but in a greater residual amount of CO.

In both the options 2b and 3b, the improvement achieved by selective oxidation of CO, in order to reduce the CO slip, and by avoiding trim fuel, is evident.

It should be noted that both POX and ATR achieve very low emissions—as low as 0.05 for POX and 0.1 for ATR—comparable with those achieved by SMR+ATR, but with lower energy consumption, and therefore preferable.

The above example shows how the invention is able to achieve extremely low CO2 emission levels, corresponding to almost total capture (>98%), while maintaining competitive energy consumption levels.

The invention claimed is:

1. A process for synthesis of ammonia from natural gas, the process comprising:
   conversion of a charge of desulphurized natural gas and steam, with oxygen-enriched air or with oxygen, into a synthesis gas containing hydrogen, CO and CO2, in a conversion section;
   treatment of said synthesis gas including at least a shift reaction of the carbon monoxide into CO2, and subsequent separation of CO2 from the gas, thus obtaining a CO2-depleted synthesis gas and a CO2-rich gaseous flow containing the CO2 separated from the gas;
   separation of a part of said CO2-depleted synthesis gas as fuel fraction, wherein said fuel fraction is fed as fuel to at least one furnace and wherein said separation of the fuel fraction includes the split of said CO2-depleted synthesis gas into at least a first stream and a second stream, said first and second streams having the same composition, wherein the first stream forms the fuel fraction and the second stream is process gas intended for the synthesis of ammonia.

2. The process of claim 1, wherein the first stream forms the fuel fraction and the second stream is the process gas intended for the synthesis of ammonia after further purification.

3. The process of claim 1, wherein said fuel fraction is between 1% and 40% of the total amount of said CO2-depleted syngas.

4. The process of claim 1, wherein said fuel fraction is between 10% and 30% of the total amount of said CO2-depleted syngas.

5. The process of claim 1, further comprising a step for methanation of the synthesis gas and/or addition of nitrogen to the synthesis gas.

6. The process of claim 5, wherein said fuel fraction is separated upstream of the methanation step or upstream of the nitrogen addition step.

7. The process of claim 1, wherein said $CO_2$-depleted syngas contains no more than 1000 ppm by volume of $CO_2$.

8. The process of claim 1, wherein said enriched air contains at least 50% oxygen.

9. The process of claim 1, wherein said enriched air contains at least 90% oxygen.

10. The process of claim 1, wherein said fuel fraction of the synthesis gas feeds one or more of the following apparatuses: a steam production and/or superheating furnace; one or more burners of a primary steam reformer; or one or more furnaces for pre-heating the charge of an autothermal reformer or partial oxidation reactor or natural-gas desulphurization section.

11. The process of claim 1, wherein: a purge gas of the ammonia synthesis process, containing hydrogen and methane, is treated so as to recover the hydrogen contained in the purge gas, obtaining a hydrogen-rich gas and a tail gas containing methane; at least part of said tail gas is recycled as process gas and subjected to said step of conversion of the natural gas into synthesis gas.

12. The process of claim 1, wherein: a part of said $CO_2$-depleted syngas is treated in a unit for separation of nitrogen, obtaining a first stream of nitrogen-depleted syngas and a second nitrogen-enriched stream; at least one part of said first stream, is used as fuel; any remaining part of said first stream is fed to the synthesis of ammonia together with the second stream.

13. The process of claim 1, further comprising a step of expansion, with production of mechanical work, of the $CO_2$-depleted syngas, after heating the $CO_2$-depleted syngas.

14. The process of claim 1, wherein the overall steam/carbon ratio in the conversion step is greater than 2.0.

15. The process of claim 1, wherein the overall steam/carbon ratio in the conversion step is greater than 2.4.

16. The process of claim 1, wherein the overall steam/carbon ratio in the conversion step is greater than 2.7.

17. The process of claim 1, wherein
said synthesis gas fuel fraction forms all of the fuel of the furnaces used in the conversion section, or
an amount of natural gas is provided as trim fuel, said trim fuel accounting for not more than 15% of the total combustion heat.

18. The process of claim 1, wherein:
the fuel fraction is produced in excess with respect to the fuel necessary for the conversion section, the quantity of said fuel fraction exceeding that required being exported from the process; and
regulation of the conversion section is performed by modulating the quantity of said fuel fraction directed towards the conversion section and the quantity exported from the process.

19. The process of claim 1, wherein:
the conversion of the natural gas charge into synthesis gas includes a step of autothermal reforming, or a step of partial oxidation;
said step of autothermal reforming or partial oxidation is performed with a steam/carbon ratio not greater than 2.

20. The process of claim 1, wherein the conversion of the natural gas into synthesis gas includes primary reforming of the natural gas in the presence of steam and secondary reforming performed with said oxygen flow or enriched air.

21. A method for revamping a plant for synthesis of ammonia from natural gas or ammonia/urea plant, wherein the plant includes a reforming section that includes a primary steam reformer and an air-fired secondary reformer, and a section for treatment of the synthesis gas by a shift reaction of carbon monoxide into carbon dioxide, and decarbonation; the method comprising:
providing a flow of enriched air or oxygen and using said flow as oxidant, instead of air, for the secondary reformer;
separating a part of the synthesis gas, downstream of decarbonation, for use as fuel fraction, and allocating a remaining process fraction of the synthesis gas for ammonia conversion;
feeding said fuel fraction of the gas, which has a reduced $CO_2$ content, as fuel for at least one furnace of the plant.

22. The method of claim 21, further comprising installing an air separation unit so as to provide said oxygen or enriched air flow, wherein said separation unit also provides a nitrogen flow which is added to the process fraction of the synthesis gas in order to obtain the desired $H_2/N_2$ ratio.

23. The method of claim 21, wherein the section for treatment of the synthesis gas by the shift reaction of carbon monoxide includes methanation.

* * * * *

(12) EX PARTE REEXAMINATION CERTIFICATE (246th)
Ex Parte Reexamination Ordered under 35 U.S.C. 257

United States Patent
Baratto et al.

(10) Number: US 11,286,168 C1
(45) Certificate Issued: Jul. 16, 2024

(54) PROCESS FOR THE SYNTHESIS OF AMMONIA WITH LOW EMISSIONS OF CO2 IN ATMOSPHERE

(71) Applicant: CASALE SA, Lugano (CH)

(72) Inventors: Francesco Baratto, Como (IT); Raffaele Ostuni, Lugano (CH)

(73) Assignee: CASALE SA, Lugano (CH)

Supplemental Examination Request:
No. 96/000,424, Apr. 26, 2023

Reexamination Certificate for:
Patent No.: 11,286,168
Issued: Mar. 29, 2022
Appl. No.: 16/485,695
PCT Filed: Jan. 31, 2018
PCT No.: PCT/EP2018/052358
§ 371 (c)(1),
(2) Date: Aug. 13, 2019
PCT Pub. No.: WO2018/149641
PCT Pub. Date: Aug. 23, 2018

(30) Foreign Application Priority Data

Feb. 17, 2017 (EP) .................... 17156256
Oct. 6, 2017 (EP) .................... 17195305

(51) Int. Cl.
*C01C 1/04* (2006.01)
*C01B 3/02* (2006.01)
*C01B 3/48* (2006.01)

(52) U.S. Cl.
CPC ............... *C01C 1/04* (2013.01); *C01B 3/025* (2013.01); *C01B 3/48* (2013.01); *C01B 2203/0244* (2013.01); *C01B 2203/0283* (2013.01); *C01B 2203/042* (2013.01); *C01B 2203/0445* (2013.01); *C01B 2203/0475* (2013.01); *C01B 2203/068* (2013.01); *C01B 2203/1241* (2013.01)

(58) Field of Classification Search
None
See application file for complete search history.

(56) References Cited

To view the complete listing of prior art documents cited during the supplemental examination proceeding and the resulting reexamination proceeding for Control Number 96/000,424, please refer to the USPTO's Patent Electronic System.

*Primary Examiner* — Alan D Diamond (57) ABSTRACT

Process for the synthesis of ammonia from natural gas comprising conversion of a charge of desulphurized natural gas and steam, with oxygen-enriched air or oxygen, into a synthesis gas, and treatment of the synthesis gas with shift reaction and decarbonation, wherein a part of the CO2-depleted synthesis gas, obtained after decarbonation, is separated and used as fuel fraction for one or more furnaces of the conversion section, and the remaining part of the gas is used to produce ammonia.

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 20-23 are cancelled.

Claims 1, 10 and 19 are determined to be patentable as amended.

Claims 2-9 and 11-18, dependent on an amended claim, are determined to be patentable.

1. A process for synthesis of ammonia from natural gas, the process comprising:
   conversion of a charge of desulphurized natural gas and steam, with oxygen-enriched air or with oxygen, into a synthesis gas containing hydrogen, CO and CO2, in a conversion section *including an autothermal reformer downstream from a pre-reformer and without a primary reformer therebetween*;
   treatment of said synthesis gas including at least a shift reaction of the carbon monoxide into CO2, and subsequent separation of CO2 from the gas, thus obtaining a CO2-depleted synthesis gas and a CO2-rich gaseous flow containing the CO2 separated from the gas;
   separation of a part of said CO2-depleted synthesis gas as fuel fraction, wherein said fuel fraction is fed as fuel to at least one furnace and wherein said separation of the fuel fraction includes the split of said CO2-depleted synthesis gas into at least a first stream and a second stream, said first and second streams having the same composition, wherein the first stream forms the fuel fraction and the second stream is process gas intended for the synthesis of ammonia.

10. The process of claim 1, wherein said fuel fraction of the synthesis gas feeds one or more of the following apparatuses: a steam production and/or superheating furnace; [one or more burners of a primary steam reformer;] or one or more furnaces for pre-heating the charge of [an] *the* autothermal reformer [or partial oxidation reactor] or natural-gas desulphurization section.

19. The process of claim 1, wherein:
   [the conversion of the natural gas charge into synthesis gas includes a step of autothermal reforming, or a step of partial oxidation;
   said step of autothermal reforming or partial oxidation] *conversion of the charge of desulphurized natural gas and steam into the synthesis gas in the autothermal reformer* is performed with a steam/carbon ratio not greater than 2.

* * * * *